H. HASSENPFLUG.
Velocipede.
No. 221,917. Patented Nov. 25, 1879.
2 Sheets—Sheet 1.
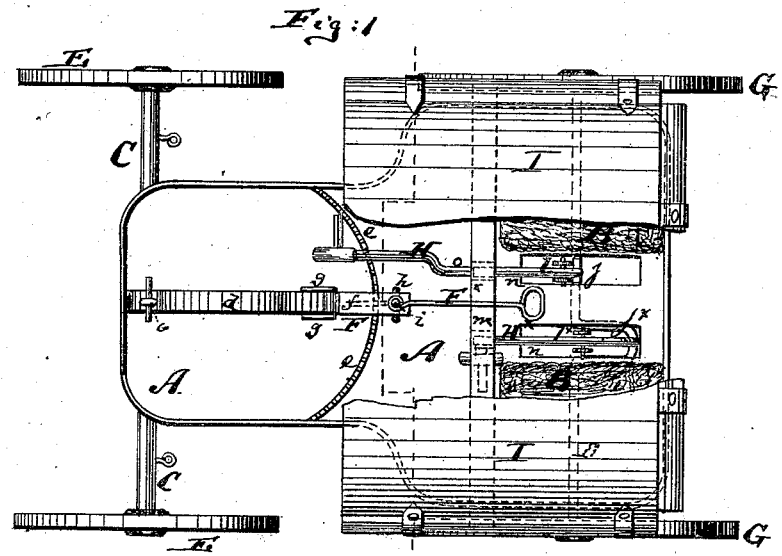
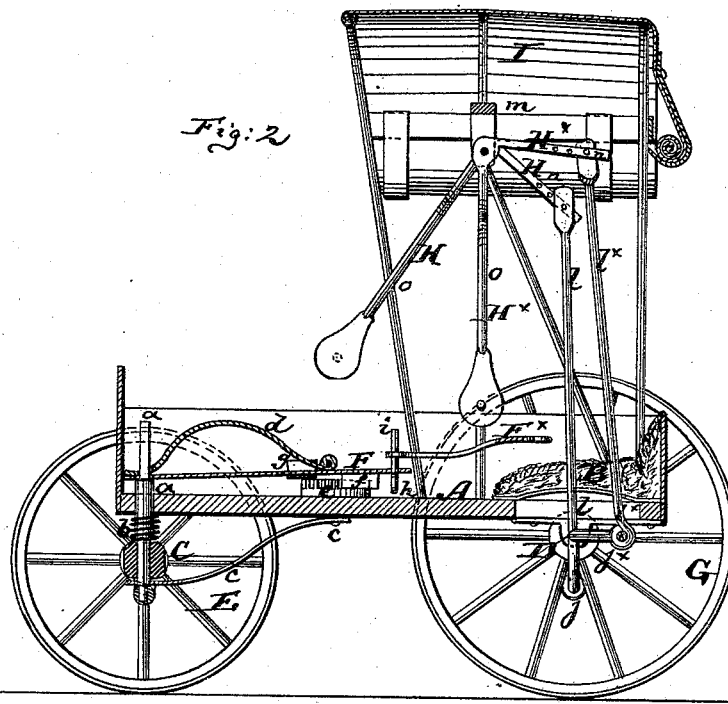
Witnesses:
John C. Tunbridge,
Willy J. E. Schultz.
Inventor:
Henry Hassenpflug
by his attorney
A. v. Briesen

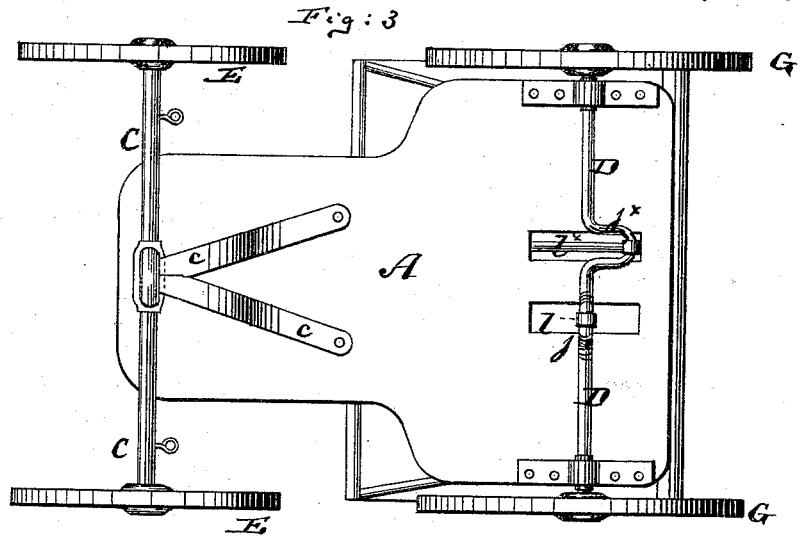
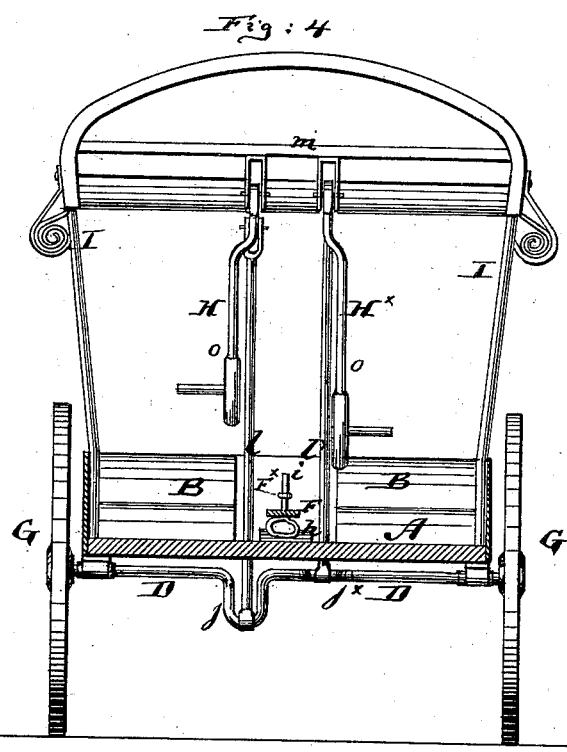

UNITED STATES PATENT OFFICE.

HENRY HASSENPFLUG, OF HUNTINGDON, PENNSYLVANIA.

IMPROVEMENT IN VELOCIPEDES.

Specification forming part of Letters Patent No. 221,917, dated November 25, 1879; application filed September 24, 1879.

*To all whom it may concern:*

Be it known that I, HENRY HASSENPFLUG, of Huntingdon, in the county of Huntingdon and State of Pennsylvania, have invented an Improved Velocipede, of which the following is a specification.

This invention relates to a new wheeled vehicle which is provided with means for enabling the occupant or occupants to propel the same forward, but which may, whenever required, be drawn by a horse or horses.

The invention consists in a new pendulum-lever mechanism for imparting rotary motion to the hind axle; in novel steering devices connecting with the swiveled front axle; and in other details of improvement which are hereinafter more fully pointed out.

In the accompanying two sheets of drawings, Figure 1 represents a plan or top view of my improved velocipede, part of the top being removed in order to show the mechanism below. Fig. 2 is a vertical longitudinal section of the same. Fig. 3 is a bottom view of the same, and Fig. 4 a vertical cross-section of the same.

A represents the body of the carriage or velocipede. B B are the seats therein. Two seats are shown; but one only may be used.

The carriage-body is supported on a front axle, C, and on a hind axle, D. The front axle is swiveled to the carriage-body by a king-bolt, $a$, so that it may be turned thereon for steering purposes. Between the front axle and the carriage-body A, I prefer to place a spiral spring, $b$, around the king-bolt, to give a yielding support to the front part of the carriage. The lower end of the king-bolt connects with additional springs $c$ $c$, that are attached to the under side of the carriage-body. The front axle is supported on wheels E E, which are hung loosely thereon.

The upper flattened or squared end of the king-bolt projects into the carriage proper, and receives a steering-lever, F, which projects backwardly toward the seat part. The lever F is fitted upon the bolt $a$ so as to be capable of swinging up and down independently, whereas, in turning the lever sidewise, the lever, king-bolt, and front axle move together.

A spring, $d$, attached to the front end of the lever F, presses with its free back end upon said lever, and holds it in contact with a toothed segment, $e$, which is secured to the floor of the carriage.

A tooth, $f$, on the under side of the lever F enters one of the teeth of the segment $e$, and prevents the lever from being swung sidewise unless it is first raised to liberate the tooth from the segment. Whenever the lever is thus raised the free end of the spring $d$ slides on the lever. The free end of the spring $d$ is confined between two ears, $g$ $g$, that project upwardly from the sides of the lever F and prevent the spring $d$ from sliding off sidewise.

A foot-loop, $h$, is attached to the under side of the lever F at or near the rear end of same, to enable the operator with his foot to raise and swing said lever, and to perform the steering of the vehicle. In addition, there is a hand extension-lever, $F^\times$, applied to an upwardly-extending pin, $i$, of the lever F, to enable the operator to vibrate the lever F sidewise by hand. The extension-lever $F^\times$ is free to swing up and down on the pin $i$.

The rear axle, D, is hung in suitable brackets that are attached to the carriage-body. Two wheels, G G, rigidly secured upon the axle D, serve to support the same. The axle D has two cranks, $j$ and $j^\times$, arranged preferably at right angles to one another, so as to prevent the occurrence of a dead-point. These cranks are respectively connected by rods $l$ and $l^\times$ to the short arms of elbow-levers H and $H^\times$, that are pivoted to a cross-brace, $m$, of the carriage-top—that is to say, the carriage-top I, which is otherwise of suitable construction, is at the proper height above the seat provided with the cross-bar $m$. The said cross-bar $m$, which braces the carriage-top laterally, serves also to sustain the elbow-levers H $H^\times$ on their proper pivots; but instead of making the brace or cross-bar $m$ part of the carriage-top, I may make it part of a separate frame, leaving the carriage-top entirely away, or constructing it so that it may be easily folded up or down in the usual manner.

The elbow-levers H $H^\times$ have their short arms, $n$, pivoted to the rods $l$ $l^\times$, while their long arms, $o$, are weighted at their lower ends and provided with handles, so that they can be readily grasped by the hands of the operator. The two levers H $H^\times$ are either brought rather near together at the middle of the carriage, as in the drawings, so that two persons may operate them, or they may be applied to opposite sides of the same seat to be worked by one single person.

The short arms, $n$, have series of holes, so that the power may be varied according as the connecting-rods $l\,l^\times$ are applied nearer to or farther away from the pivots of the levers. For gaining speed or power it may be desirable to connect the rods $l\,l^\times$ with shafts, which are geared into the hind axle and capable of being thrown out of gear when desired.

I claim—

1. The combination of the frame A and cross-piece $m$, and of the pendulum elbow-levers H $\text{H}^\times$, having arms $n$ and $o$, the arms $o$ being weighted at their lower ends and provided with handles at said lower ends, with the rods $l\,l^\times$ and crank-axle D of a perambulator, the rods $l\,l^\times$ being joined to the arms $n$ of the elbow-levers, substantially as and for the purpose herein shown and described.

2. The combination of the king-bolt $a$ of the steering-axle C with the steering-lever F and sliding spring $d$, which spring is guided between the lugs or ears $g\,g$, substantially as and for the purpose herein shown and described.

3. The combination of the lever F of the steering apparatus, which lever is provided with the tooth $f$, with the segment $e$ and spring $d$, substantially as and for the purpose herein shown and described.

4. The lever F of the steering apparatus, provided with the foot-loop $h$ and with the hand extension-lever $\text{F}^\times$, substantially as and for the purpose herein shown and described.

HENRY HASSENPFLUG.

Witnesses:
TOMPSON B. MOSHER,
RICHARD LIGHTNER.